United States Patent [19]
Kobayashi et al.

[11] Patent Number: 5,808,843
[45] Date of Patent: Sep. 15, 1998

[54] MAGNETORESISTANCE EFFECT REPRODUCTION HEAD

[75] Inventors: Toshio Kobayashi, Hinodemachi; Isamu Yuito, Ome; Masahiro Kitada, Hamura; Noboru Shimizu, Tokorozawa; Naoki Koyama, Kokubunji, all of Japan

[73] Assignee: Hitachi, Ltd., Tokyo, Japan

[21] Appl. No.: 890,170

[22] Filed: May 29, 1992

[30] Foreign Application Priority Data

May 31, 1991 [JP] Japan ................................. 3-129083
Sep. 5, 1991 [JP] Japan ................................. 3-225983

[51] Int. Cl.$^6$ ..................................................... G11B 5/39
[52] U.S. Cl. ................................................... 360/113
[58] Field of Search ................................. 360/113, 126, 360/122; 338/32 R

[56] References Cited

U.S. PATENT DOCUMENTS

| | | | |
|---|---|---|---|
| 4,425,593 | 1/1984 | Postma | 360/113 |
| 4,663,607 | 5/1987 | Kitada et al. | 360/113 |
| 4,663,684 | 5/1987 | Kamo et al. | 360/113 |
| 4,663,685 | 5/1987 | Tsang | 360/113 |
| 4,713,708 | 12/1987 | Krounbi et al. | 360/113 |
| 4,734,644 | 3/1988 | Imakoshi et al. | 360/113 |
| 4,943,883 | 7/1990 | Sano et al. | 360/126 |
| 5,005,096 | 4/1991 | Krounbi et al. | 360/113 |
| 5,018,037 | 5/1991 | Krounbi et al. | 360/113 |
| 5,206,590 | 4/1993 | Dieny et al. | 360/113 |

FOREIGN PATENT DOCUMENTS

| | | |
|---|---|---|
| 56-165925 | 12/1981 | Japan . |
| 60-59518 | 4/1985 | Japan . |

*Primary Examiner*—Stuart S. Levy
*Assistant Examiner*—Kevin M. Watkins
*Attorney, Agent, or Firm*—Fay, Sharpe, Beall, Fagan, Minnich & McKee

[57] ABSTRACT

A magnetoresistance effect reproduction head which comprises a magnetoresistive layer having a central sensing region and an end domain control region and formed into a thin film of a ferromagnetic material, a hard magnetic layer overlapping with the end domain control region in direct contact therewith and formed into a thin film of a hard magnetic material, a magnetic field and a longitudinal magnetic bias field by ferromagnetic exchange coupling is generated for maintaining the central sensing region of the magnetoresistive layer in single domain state.

10 Claims, 8 Drawing Sheets

MAGNETORESISTANCE EFFECT REPRODUCTION HEAD

BACKGROUND OF THE INVENTION

The present invention relates to a magnetoresistance effect reproduction head for reading out an information signal from a magnetic medium. More specifically, the invention relates to a magnetoresistance effect reproduction head having a feature in a bias field for use in a magnetic recording and reproducing apparatus.

Conventionally, there have been disclosed magnetic reading and converting devices called magnetoresistive (MR) elements or heads. The MR element is capable of reading data from a magnetic surface having a substantially high recording density. The MR element uses a variation of resistance of a read element made of a magnetoresistive material and detects a field signal as a function of an amount and a direction of flux sensed by the element. It has been also disclosed that two bias fields have to be applied for optimally operating the MR element.

For applying a bias to the MR element such that the response to the flux becomes linear, a transverse bias field is typically used. Such a bias field is perpendicular to the surface of a magnetic recording medium and parallel to a surface of the flat MR element. There are various methods such as shunt biasing, soft-film biasing, soft adjacent layer (SAL) biasing and so forth (see U.S. Pat. No. 4,663,685, for example).

These transverse bias fields are generated in a level sufficient for biasing the head in a range where the R-H characteristic curve is the closest to linear.

Another bias field used with the MR element is a longitudinal bias field. The longitudinal bias field is to be established parallel to the surface of the magnetic recording medium and parallel to the longitudinal direction of the MR element. The function of the longitudinal bias field is to suppress Barkhausen noise which is generated from the multi-domain effect in the MR element.

Also, there have been developed a number of biasing methods and devices for the MR elements. For obtaining higher recording density, it becomes necessary to make recording tracks narrower and to make the recording density along the track higher. However, there has not been realized a compact MR element satisfying this requirement at the present.

Theoretical solutions for the problem by effecting a patterned vertical bias have been proposed in Japanese Unexamined Patent Publication No, 60-59518 and U.S. Pat. No. 5,005,096 (corresponding to Japanese Unexamined Patent Publication No. 2-220213). In short, the above-mentioned example establishes a proper single domain state at the end region of a magnetoresistive (MR) layer and, as a result, induces a single domain state in the central sensing region of the MR layer. This can be realized by applying the longitudinal bias field only at the end region of the MR layer. The longitudinal bias field is realized by ferromagnetic exchange coupling or magnetostatic coupling between a hard magnetic layer and a soft magnetic MR layer.

Japanese Unexamined Patent Publication No. 60-59518 discloses a method for achieving the longitudinal bias field by ferromagnetic exchange coupling with a ferromagnetic layer having a greater coercive force than the MR layer only at the portion where an electrode and the MR layer overlap. The thicknesses of the films employed are 200 to 1000 Å (20 100 nm) in the MR layer and 500 to 3000 Å (50 to 300 nm) in the ferromagnetic layer having a greater coercive force.

U.S. Pat. No. 5,005,096 discloses a method for realizing the longitudinal bias by the magnetostatic coupling between the hard magnetic layer and the MR element. In this method, the specific coercive force of the ferromagnetic layer can be substantially lost if exchange coupling between the hard magnetic layer and the soft magnetic MR layer is established to cause problems in maintenance of the bias field. Also, the flux from the ferromagnetic layer can affect the sensitivity profile. To avoid these effects, the ferromagnetic layer is placed parallel to the MR layer, but spaced apart therefrom. In practice, between the end domain restrictive regions of a ferromagnetic film and the MR layer, a nonmagnetic spacer layer is inserted and the thickness of the ferromagnetic film is selected such that a flux ratio between the flux of the end domain restrictive region of the MR layer and the longitudinal flux of the central sensing region of the MR layer becomes a desired value. For this purpose, the spacer layer having a thickness in a range of 50 to 200 nm is suitable. As an electrically conductive nonmagnetic material, Cr, W, Nb and Ta are preferred.

On the other hand, U.S. Pat. No. 4,663,685 (corresponding to Japanese Unexamined Patent Publication No. 62-40610) proposes to apply the longitudinal bias field using an anti-ferromagnetic material (MnFe) for controlling the magnetic domain and the magnetic wall of the MR layer for reducing noise.

SUMMARY OF THE INVENTION

In case of U.S. Pat. No. 4,663,685, in which magnetic domain control is performed using an anti-ferromagnetic material, the material to be used is practically limited to MnFe in view of magnetic characteristics, such as the Neel point and so forth. However, MnFe has a problem in corrosion resistance, and can control the magnetic domain of the MR layer only by ferromagnetic coupling at the portion contacting with the MR layer.

A hard magnetic layer can control the magnetic domain with the ferromagnetic coupling at the contacting portion and a field leaking from the ferromagnetic layer. Therefore, the method of magnetic domain control for the MR layer with the hard magnetic layer has a wider variation of implementation, a higher magnetic domain control effect, and greater freedom in application than that of the anti-ferromagnetic film.

However, in Japanese Unexamined Patent Publication No. 60-59518 and U.S. Pat. No. 5,005,096, there remain problems in that the ferromagnetic layer having a greater coercive force is provided only at the portion where the soft magnetic MR layer and the electrode overlap, in that the specific coercive force of the hard magnetic layer exchange coupled with the soft magnetic MR layer is substantially lost to the lower capability of holding the bias field, and in that the flux from the hard magnetic layer affects the transverse sensitivity profile.

Furthermore, only the field leaking from one of the magnetic poles of the hard magnetic film has been used, and the field leaking from the other magnetic pole is not used so that it may enter into the MR layer to disturb the magnetic state, act on a medium opposing the head to cause recording demagnetization, or enter into magnetic shield layers sandwiching the MR layer or into a core of an adjacent induction-type recording head to serve as a cause of noise generation.

It is an object of the present invention to provide a compact and low-noise level MR head by providing an excellent MR element.

A particular object of the present invention is to realize an MR head which can effectively apply a longitudinal bias field for a thin MR layer and which can suppress Barkhausen noise.

A further object of the present invention is to effectively apply a longitudinal bias field employing a hard magnetic material, such as a permanent magnet.

In order to accomplish the above-mentioned objects, a MR head according to the present invention comprises a MR layer having a central sensing region and an end domain control region formed into a thin film of a ferromagnetic material, and a hard magnetic layer overlapping with the end domain control region in direct contact therewith and formed into a thin film of a hard magnetic material, wherein a magnetic field and a longitudinal magnetic bias field resulting from ferromagnetic exchange coupling are generated for maintaining the central sensing region of the layer in a single domain state.

There has not been known the magnetoresistive element of the construction, in which the necessary longitudinal bias field, resulting from the ferromagnetic exchange coupling between the hard magnetic layer and the end domain control region, and the magnetic field are generated by the hard magnetic layer.

The present invention is based on the finding that Barkhausen noise can be suppressed without providing the hard magnetic layer only for the portion in which the soft magnetic MR layer and the electrode overlap and without establishing magnetostatic coupling between the soft magnetic MR layer and the hard magnetic layer by inserting the nonmagnetic layer between the soft magnetic MR layer and the hard magnetic layer, as a result of detailed study of the problems of the devices described in Japanese Unexamined Patent Publication No. 60-59518 and U.S. Pat. No. 5,005,096. In these known devices, the ferromagnetic layer having a large coercive force is disposed only at the portion where the soft magnetic MR layer and the electrode overlap, the specific coercive force of the hard magnetic layer is substantially lost by exchange coupling with the soft magnetic MR layer, the bias field cannot be maintained, and the magnetic flux from the hard magnetic layer may influence the transverse sensitivity profile. The invention is particularly effective when the layer thickness of the MR layer is less than or equal to 20 nm.

Preferably, the MR layer formed by a thin film of a ferromagnetic material and the hard magnetic layer formed by a thin film of the hard magnetic material which is directly in contact with the MR layer, are at least provided. The layer thickness of the MR layer is greater than or equal to 5 nm and less than 20 nm, the layer thickness of the hard magnetic layer is in a range of 10 to 100 nm, and the ratio of the thickness of the hard magnetic layer versus the thickness of the MR layer is greater than or equal to 1.

In the preferred construction, the MR head at least comprises the MR layer made of a ferromagnetic material and having a central sensing region and an end domain control region, and the hard magnetic layer placed adjacent to the MR layer, in which the magnetic head overlaps the end domain control region in direct contact therewith, and in which the length of the central sensing region is greater than the track width (distance between the inner ends of the electrodes).

Also in the preferred construction, the MR head at least comprises the MR layer made of a ferromagnetic material and having a central sensing region and an end domain control region, and the hard magnetic layer placed adjacent to the MR layer, in which the end domain control region of the MR layer is placed above the hard magnetic layer.

According to another effective aspect of the invention, wherein the magnetoresistance effect head employs the magnetoresistive layer as a magnetic sensing layer, the magnetic domain in the MR layer is controlled with a magnetic field leaking from the hard magnetic layer and ferromagnetic exchange coupling between the MR layer and the hard magnetic layer, and the magnetic field leaking from the hard magnetic layer is virtually closed within the ferromagnetic body forming the magnetic head.

As shown in FIG. 9, among two magnetic fields 2 leaking from the permanent magnet 1 as the hard magnetic layer provided on the MR layer 3 via the insulation layer 6, only one of the magnetic fields at one magnetic pole has been used for the magnetoresistive layer 3. The other magnetic field leaking from the other magnetic pole has not been used. In certain cases, the magnetic field which is not used enters into the MR layer 2 to disturb the magnetic field condition to lower the effect of the magnetic domain control. On the other hand, the magnetic field leaking to the space may also influence the medium to cause demagnetization. Furthermore, the magnetic field can enter into the magnetic shield lying on both sides of the MR layer or into the core of the adjacent induction-type recording head to be a cause of noise generation.

Accordingly, it is required to prevent the leaking magnetic field of the permanent magnet from leaking into the space.

In the present invention, the magnetic field leaking from the hard magnetic layer formed adjacent the MR layer enters into the soft magnetic layer used for applying bias or the magnetic shield so that the magnetic field can be closed within the magnetic body. This enables magnetic domain control as well as prevention of the magnetic field from effecting harmful influence. By application in this manner, the effect of magnetic domain control for the soft magnetic bias layer or the magnetic shield layer can be achieved. The resulting effect in reduction of head noise is also a feature of the present invention.

According to the present invention, since the magnetization of the soft magnetic layer can be additionally controlled with the magnetic field of the hard magnetic layer, a stable output waveform of the head can be obtained. Furthermore, even in the head construction, where a common core is employed for the magnetic shield and the induction-type magnetic head for recording, the characteristics of the recording head can be controlled to be constant as the magnetization of the core can be controlled.

The hard magnetic layer in the MR head according to the present invention can be formed of a material selected from Co-Pt, Co-Pt-Cr, Co-Pt-Pd, Co-Pt-Ni or Co-Cr-Ta alloy film, which allows the reproduction head to be well shielded against adverse surroundings. By installing such a MR head in a reproduction apparatus, a high density magnetic recording and reproducing apparatus can be realized.

DESCRIPTION OF THE PREFERRED EMBODIMENT

[First Embodiment]

Figure 1:
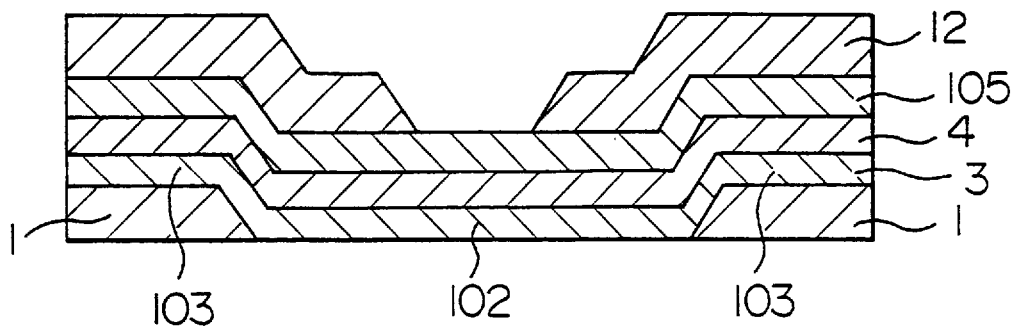
FIG. 1 is an illustration showing one example of a construction of a magnetoresistive (MR) reproduction head in the first embodiment of the present invention.

The construction of a magnetoresistive (MR) reproduction head according to the present invention is illustrated in FIG. 1.

In FIG. 1, a magnetic head is formed with a MR layer 3, a shunt layer 4, a SAL layer 105, a hard magnetic layer 1, and an electrode layer 12. The MR layer 3 is divided into a central sensing region 102 for detecting a magnetic information field from a medium, and an end magnetic domain control region 103 for controlling the construction of a magnetic domain of the central sensing region 102 for suppressing Barkhausen noise.

The present invention applies a bias for the MR layer 3 in a different manner to those disclosed in Japanese Unexamined Patent Publication Nos. 60-59518 and 2-220213. Namely, both of the longitudinal bias field and a transverse bias field bias the central sensing region 102. Here, the longitudinal bias field is established parallel to the MR layer 3 by the hard magnetic layer 1 directly contacting with the end magnetic domain control region 103. On the other hand, the transverse bias field is generated by the shunt layer 4 and the SAL layer 105 laying parallel to the MR layer 3. The electrode layer 12 transmits a signal detection current and a bias current to the MR layer 3 and the shunt layer 4. An output signal is detected between the internal ends of the electrode layer 12 as an electrical path for transmitting the output signal to an external electrical circuit.

In this embodiment, the thickness of the MR layer 3 is set at 5 to 20 nm. The thickness of the hard magnetic layer 1 is set at 10 to 100 nm. Also, the thickness of the shunt layer 4 is set at 10 to 40 nm.

In the illustrated embodiment, the MR layer 3 is formed of a Ni-Fe alloy film, the hard magnetic layer 1 is formed of a Co-Pt-Cr alloy film, and the shunt layer 4 is formed of a Nb film. The hard magnetic layer 1 may be alternatively formed of a material for a magnetic recording medium, such as Co-Pt alloy film, Co-Pt-Pd alloy film, Co-Pt-Ni alloy film, Co-Cr-Ta alloy film or other hard magnetic materials. With this method, a magnetoresistive reproduction head having high reproduction output without Barkhausen noise can be obtained.

It should be appreciated that the thickness of the MR layer 3 is preferred to be as thin as possible for the higher current density necessary for detecting the signal and thus for higher reproduction output of the signal. In practice, the high reproduction output could be obtained at a film thickness less than 20 nm. When the thickness of the MR layer 3 becomes thinner, heat generated by the flowing current becomes smaller to restrict degradation of the MR layer 3 due to electromigration. On the other hand, by reducing the thickness of the MR layer 3, defects such as pinholes may increase. The practical available film thickness was found to be greater than or equal to 5 nm.

Figure 2:
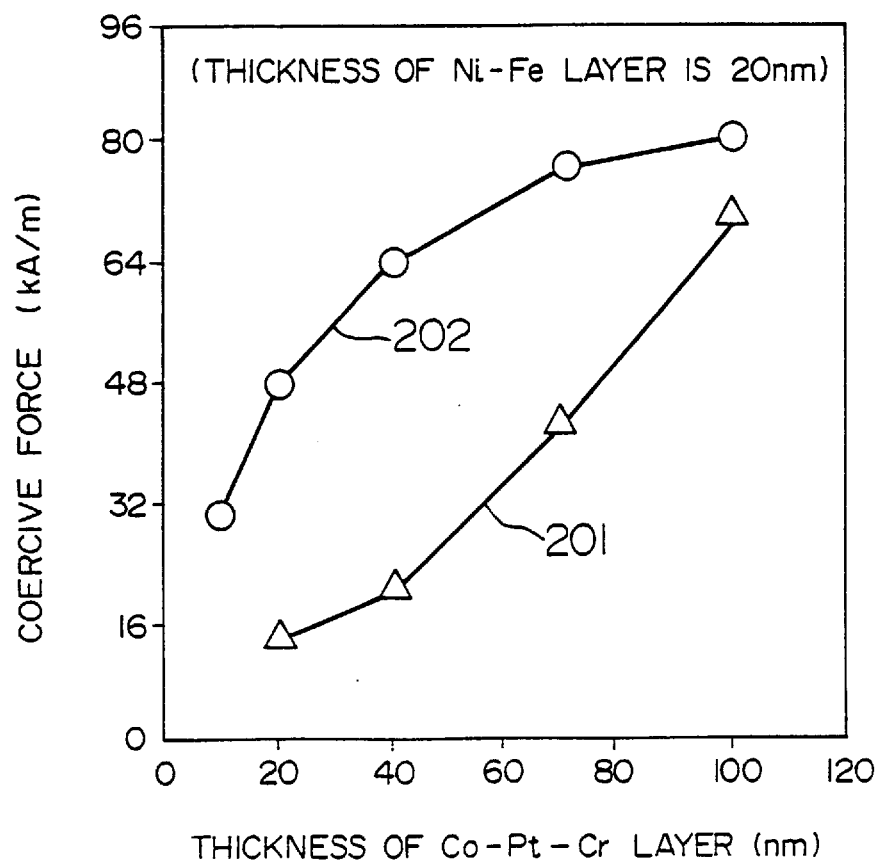
FIG. 2 is an illustration showing the influence of a film thickness of a hard magnetic layer for a coercive force of a two film portion of the end magnetic domain control region of the hard magnetic layer and a magnetoresistive layer in the MR read head exemplarily illustrated as the first embodiment of the present invention.

In this embodiment, in advance of fabrication of the magnetoresistive reproduction head, B-H curves of a Co-Pt-Cr hard magnetic layer 1 and a Ni-Fe MR layer 3 were measured. As a result of the measurement, respective layers had respectively 72 to 112 kA/m and 40 to 120 A/m of coercive forces. On the other hand, through measurement of the B-H curve of a double layer film portion of the end magnetic domain control region 103 of the hard magnetic layer 1 and the MR layer 3, the coercive force was found to have a value intermediate to both layers as shown in FIG. 2. A tendency for the coercive force of the double layer film to be reduced according to the decrease of the film thickness of the hard magnetic layer 1 is observed. Also, the B-H curve exhibits a smooth form without any steps and thus confirms that ferromagnetic exchange coupling is established between the hard magnetic layer 1 and the magnetoresistive layer 3.

In addition, it has also been found that the coercive force is differentiated between the case where the Ni-Fe film is formed above the Co-Pt-Cr film and the case where the Ni-Fe film is formed below the Co-Pt-Cr film. While the coercive force is rapidly reduced according to the decrease in thickness of the Co-Pt-Cr film in a curve 201 representative of the case where the Ni-Fe film is formed below the Co-Pt-Cr, film a curve 202 representative of the case than the Ni-Fe film is formed above the Co-Pt-Cr film exhibits moderate reduction of the coercive force. When the crystal conditions of these double layers are investigated through X-ray diffraction, different crystal conditions are observed between the cases where the Ni-Fe film is formed above and below the Co-Pt-Cr film. Because of this, it is assumed that this difference of crystal conditions is reflected in the difference of the coercive forces.

Also, as a preliminary study, a magnetoresistive element was fabricated without the shunt layer 4 and the SAL layer 105 in FIG. 1. With this magnetoresistive element, the longitudinal bias field applied to the MR layer 3 by the hard magnetic layer 1 was measured. Namely, by setting the track width (distance between internal ends of the electrode) at 4 $\mu$m and a transverse width of the MR layer 3 at 4 $\mu$m, an external AC magnetic field was generated parallel to the longitudinal direction (the longitudinal direction of the magnetoresistive layer) for measuring a shifting width of the magnetic field appearing on a response curve.

Figure 3:
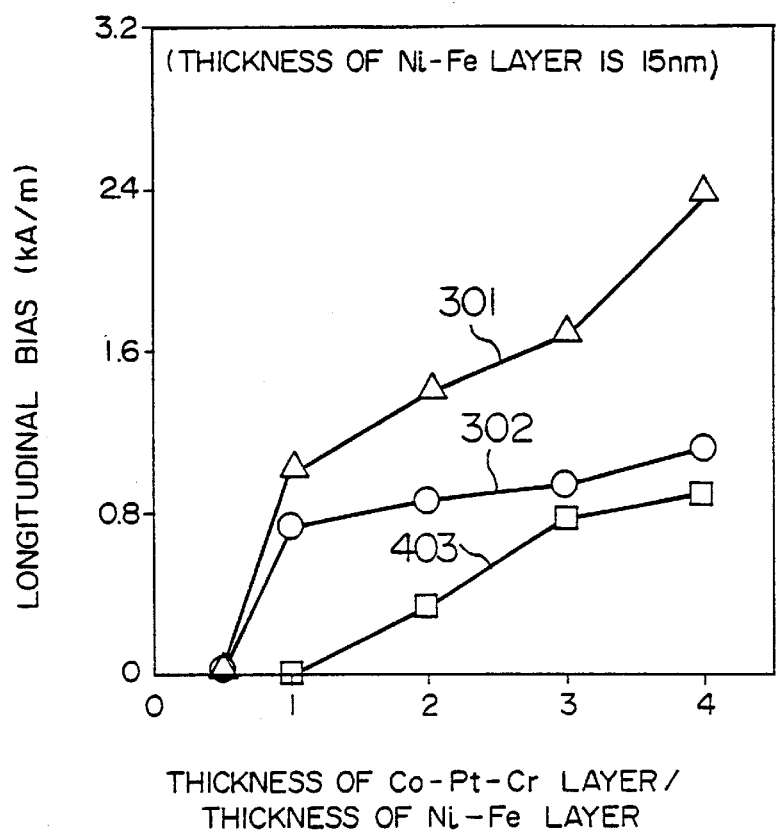
FIG. 3 is an illustration showing the influence of the thickness of the hard magnetic layer versus the thickness of the magnetoresistive layer for a longitudinal bias in the MR reproduction head as exemplarily illustrated as the first embodiment of the invention.

The relationship between the longitudinal bias field and a ratio of the thickness of the Co-Pt-Cr hard magnetic film versus Ni-Fe MR film is illustrated in FIG. 3. Reference numeral 301 shows the case where the length of the central sensing region is 10 μm and the MR layer is formed above the hard magnetic layer, reference numeral 302 shows the case where the length of the central sensing region is 50 μm and the MR layer is formed above the hard magnetic layer, and reference numeral 303 shows the case where the length of the central sensing region is 50 μm and the MR layer is placed below the hard magnetic layer.

As shown in FIG. 3, it is clear that the longitudinal bias field is generated when the ratio of the thickness of the hard magnetic layer 1 versus the thickness of the MR layer 3 is greater than or equal to 1. Accordingly, by selecting the thickness of the hard magnetic layer 1 of the magnetoresistive reproduction head, a desired longitudinal bias field can be achieved. The level of the longitudinal bias is preferred to be sufficient for maintaining the single domain state of the central sensing region 102 of the MR layer 3. It is found that a magnetoresistive reproduction head with no Barkhausen noise can be obtained by fabricating the magnetoresistive reproduction head based on the results set forth above.

It should be noted that, as shown at 303 of FIG. 3, when the MR layer 3 is formed below the hard magnetic layer 1, it becomes difficult to obtain sufficient longitudinal bias in the longitudinal direction of the element. In such case, it was found that the ratio of the thickness of the hard magnetic layer 1 to the thickness of the MR layer 3 is required to be greater than or equal to 2, and preferably, greater than or equal to 3. Namely, by forming the MR layer 3 above the hard magnetic layer 1, a sufficient bias can be obtained for a thinner hard magnetic layer.

It should also be noted that the length of the central sensing region 102 of the MR layer 3 is longer than the track width (the distance between the internal ends of the electrode), which allows a MR output to be obtained only from the inside of the MR layer 3, in which the magnetic domain is completely controlled by the longitudinal bias. This permits a magnetoresistive reproduction head with no Barkhausen noise to be obtained.

In general, when the magnetoresistive reproduction head is used in combination with an induction-type record head, soft magnetic shield layers are formed at upper and lower sides of the magnetoresistive reproduction head in order to avoid mutual influence between the magnetoresistive reproduction head and the induction-type record head and to certainly obtain positional resolution in signal reproduction. In the conventional method, although controlling the magnetic domain depends on the distance between the hard magnetic layer and the shield layer, there is a possibility of difficulty in generating a sufficient longitudinal bias field since the shield layer may absorb the flux generated by the hard magnetic layer to weaken magnetostatic coupling with the magnetoresistive layer.

In the method of controlling the magnetic domain in accordance with the present invention, ferromagnetic exchange coupling is established between the hard magnetic layer 1 and the MR layer 3, and the longitudinal bias field is applied by composing the magnetic field of the hard magnetic layer 1. Accordingly, since a small magnitude of magnetic field is externally leaked, absorption of the flux by the shield layer is minor, which otherwise is caused as set forth above. Therefore, a sufficient longitudinal bias field can be generated for the central sensing region 102 of the MR layer 3.

[Second Embodiment]

In FIG. 1, the direction of magnetization in the central sensing region 102 of the MR layer 3 is influenced by the longitudinal magnetic field from the hard magnetic layer 1 contacting with the end magnetic domain control region 103, the direction of magnetization of the end magnetic domain control region 103 of the MR layer 3 determined by the ferromagnetic exchange coupling between the hard magnetic layer 1 and the end magnetic domain control region 103 of the MR layer 3, the transverse bias field from the shunt layer 4 and the SAL layer 105, and the high frequency signal field from the medium. If the longitudinal magnetic field from the hard magnetic layer 1 and the longitudinal bias field generated by the ferromagnetic exchange coupling between the hard magnetic layer 1 and the MR layer 3 are excessively large, the magnetization in the central sensing region 103 of the MR layer 3 is not preferable for reduction of the reproduction output of the signal.

Figure 4:
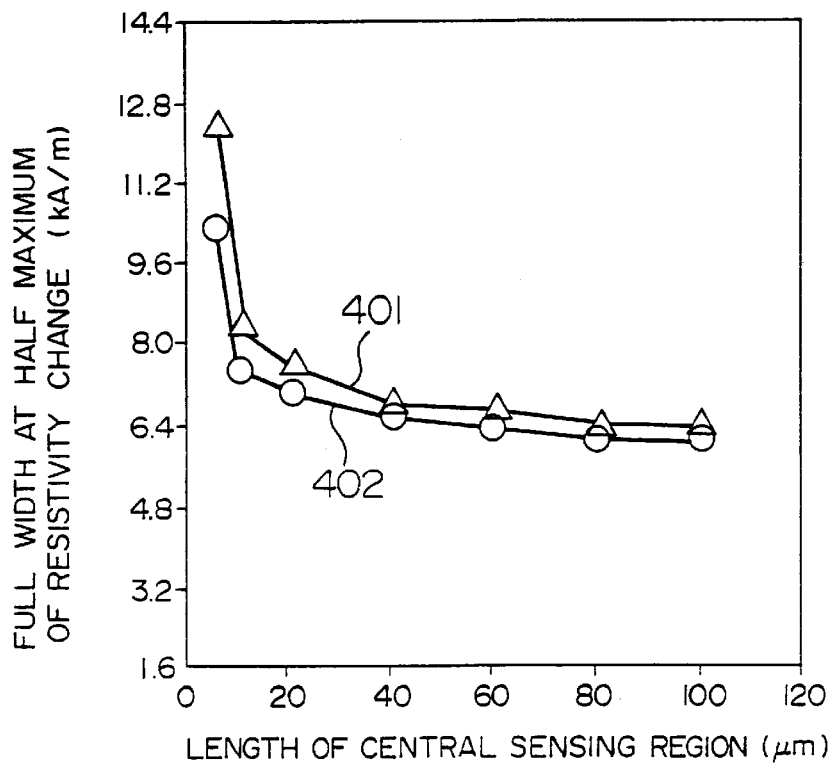
FIG. 4 is an illustration showing an influence of a length of a central sensing region of the magnetoresistive layer for a half value width of resistance variation in the MR head exemplarily illustrated as the second embodiment of the invention.

FIG. 4 illustrates the results of measurement of the half value width when a transverse AC magnetic field is charged for the construction shown in FIG. 1, in which the track width is set at 4 μm, the transverse width of the MR layer 3 is set at 4 μm, with varying the thickness of the hard magnetic layer 1 and the length of the central sensing region 102 of the magnetoresistive layer 3. Reference numeral 401 represents the case where the thickness of the Co-Pt-Cr layer is set at 80 nm and reference numeral 402 represents the case where the thickness of the Co-Pt-Cr layer is set at 40 nm.

From FIG. 4, it becomes apparent that the half value width does not show substantial variation when the length of the central sensing region 102 of the MR layer 3 is greater than or equal to 10 μm, and the influence of the thickness of the hard magnetic layer 1 is small. These are advantageous for a magnetic head fabricating process and imply that when the length of the central sensing region 102 is set longer than or equal to 10 μm, it becomes unnecessary to strictly control the thickness of the MR layer 3. However, when the length of the central sensing region 102 is long, the longitudinal bias field becomes small to easily cause Barkhausen noise.

On the other hand, when the length of the central sensing region 102 is less than or equal to 10 μm, the half value width is rapidly increased. Therefore, the longitudinal bias field becomes large to suppress the Barkhausen noise. However, shrinking the central sensing region 102 suggests a lowering of the reproduction process and difficulty for the magnetic head fabrication process.

Figure 5:
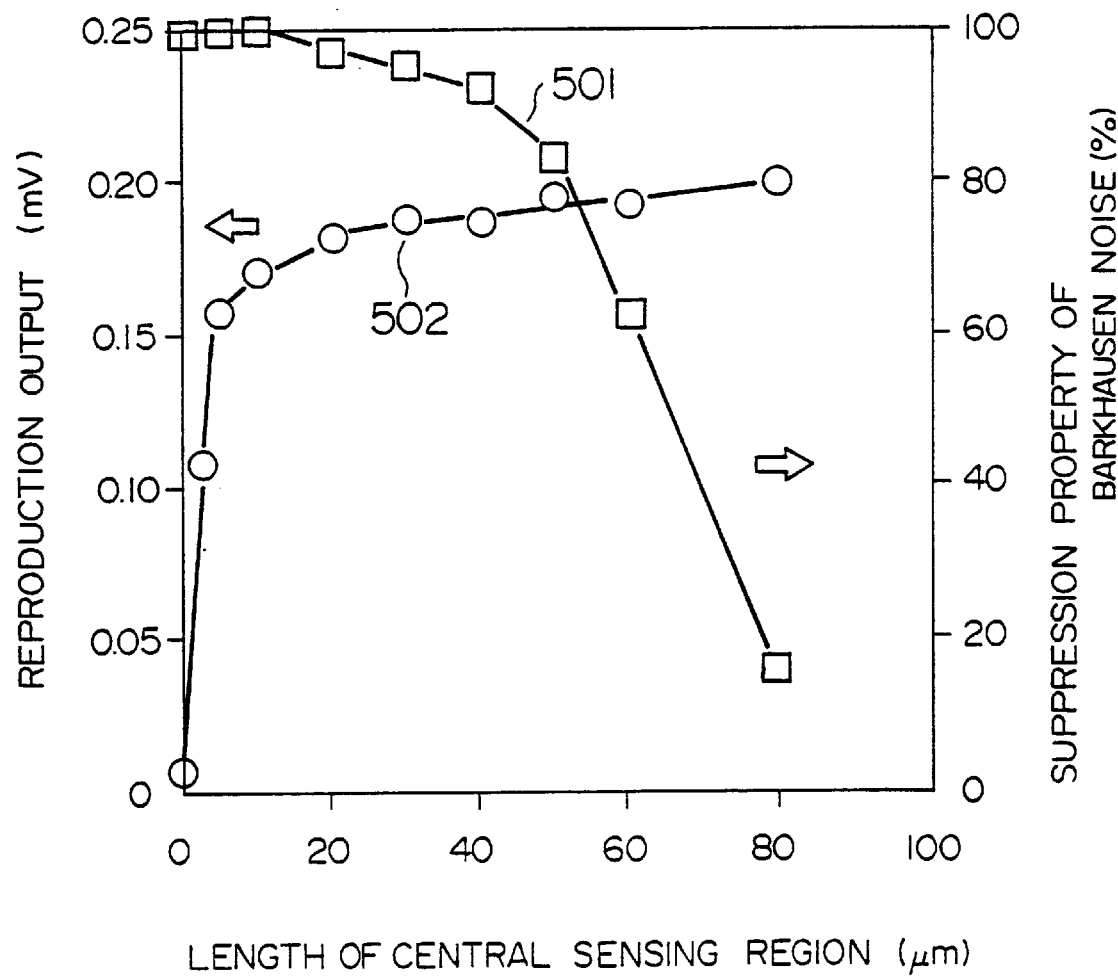
FIG. 5 is a graph showing the relationship between the length of the central sensing region, reproduction output, and Barkhausen noise.

Based on the results set forth above, the magnetoresistive reproduction head with a 3 μm track width was fabricated for detecting a recording and reproducing waveform in a magnetic disk drive. The results are shown in FIG. 5. In FIG. 5, reference numeral 501 represents a suppression ratio of Barkhausen noise and reference numeral 502 represents the reproduction output.

As shown by the curve 501, the length of the central sensing region having a high suppression ratio so as not to generate Barkhausen noise in the reproduction waveform was less than or equal to 50 μm. As shown by the curve 502, the length of the central sensing region to obtain the necessary reproduction output was greater than the track width (4 μm in this case).

At this time, the reproduction output was rapidly decreased when the length of the central sensing region became smaller than the track width to make it difficult to obtain the necessary reproduction output. With the results set forth above, when the length of the central sensing region 102 was greater than the track width, the a magnetoresistive reproduction head with no Barkhausen noise and with the necessary reproduction output could be obtained. As a result, a magnetic disk drive which could achieve a recording density greater than or equal to 200 Mb/in$^2$ could be obtained.

[Third Embodiment]

Figure 6:
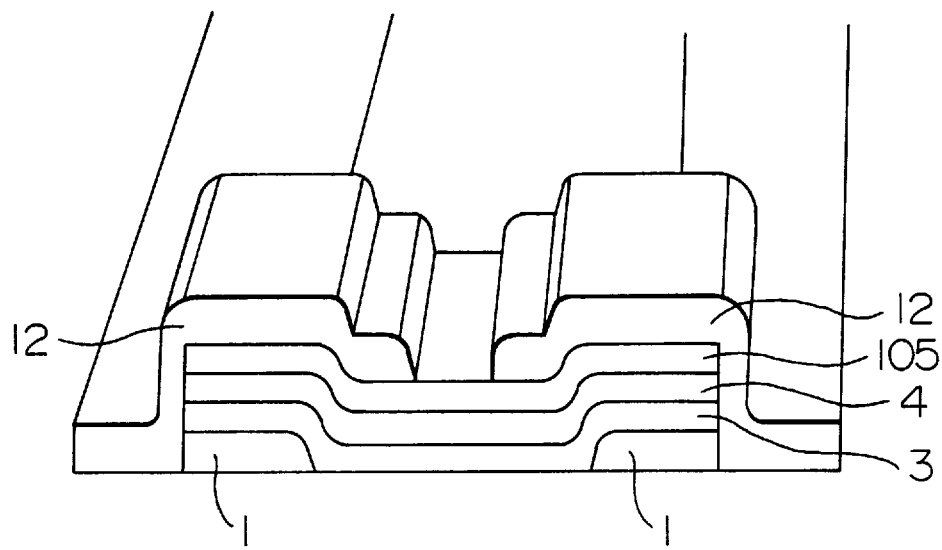
FIG. 6 is a perspective view showing a construction of one example of the MR head with a modified configuration of an electrode layer.
Figure 7:
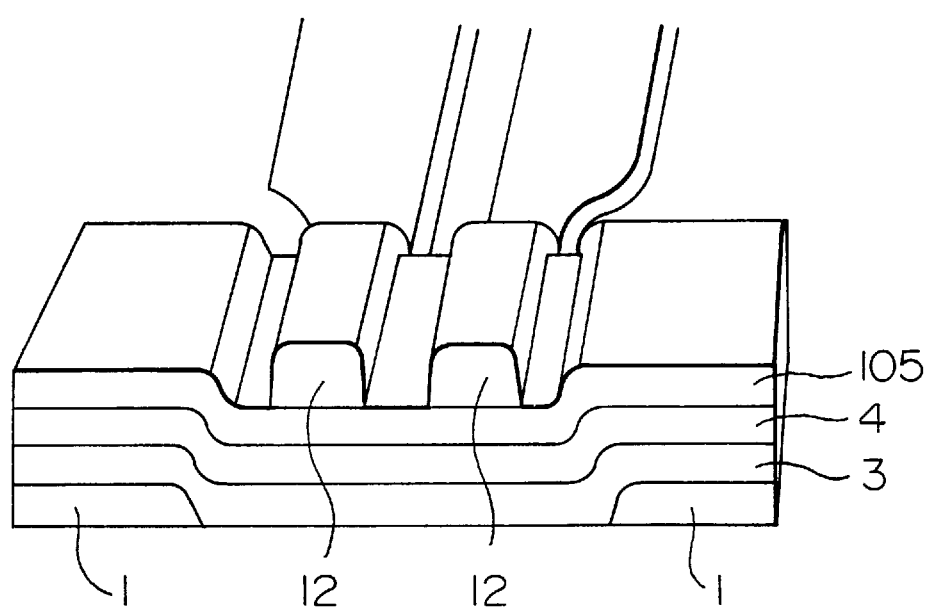
FIG. 7 is a perspective view showing a construction of another example of the MR head with a modified configuration of an electrode layer.
Figure 8:
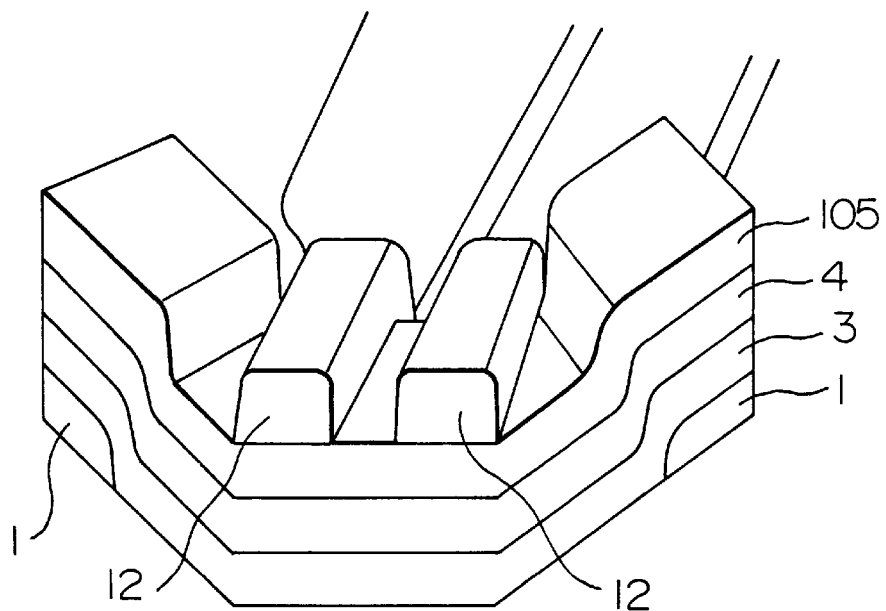
FIG. 8 is a perspective view showing a construction of a further example of the MR reproduction head, in which the hard magnetic layer is not exposed on the surface facing a medium.

Description will be given for other embodiments of the invention. FIGS. 6 and 7 show constructions of two types of magnetoresistive reproduction heads having mutually different configurations of the electrodes. FIG. 8 shows the construction of the magnetoresistive reproduction head, in which the hard magnetic layer 1 is not exposed to the surface mating with the medium. Even in these magnetoresistive reproduction heads, the magnetic domain control means having the hard magnetic layer 1 directly contacting with the MR layer 3 is effective. By setting the ratio of thickness of the hard magnetic layer 1 versus the layer thickness of the MR layer 3 at greater than or equal to 1, the magnetoresistive reproduction head can be fabricated to have no Barkhausen noise through a simplified process. It should again be noted that the reference numeral 4 denotes the shunt layer and 105 denotes the SAL layer.

In these magnetoresistive reproduction heads, the positions of the electrode layer 12 and the hard magnetic layer 1 are offset. By this, a step at the internal end of the electrode was reduced. As a result, the influence on the MR layer 3 and a recording head layer formed thereabove could be reduced. Also, with this construction, the concentration of stress by formation of the electrode layer 12 and the hard magnetic layer 1 could also be reduced. Therefore, a magnetoresistive reproduction head generating little or no Barkhausen noise could be obtained.

It should be noted that, in the above-mentioned embodiments, the shunt film 4 and the SAL film 105 were used as the transverse bias field generating means. However, the magnetoresistive reproduction head, according to the present invention, can employ other transverse bias field generating means known to those skilled in the art, such as sole shunt biasing, current biasing, in which an electrically insulative layer is inserted between the magnetoresistive layer and the shunt layer, and means known as "barberpole", in random combination. These known transverse bias charging means may be applied in the per se known manner.

The present invention does not require a nonmagnetic layer. Accordingly, it becomes possible to provide a magnetoresistive (MR) element which has a construction simplifying the element fabrication process. Another effect of the invention is to lower the height of the portion where the hard magnetic layer contacts the end magnetic domain control region so as to minimize the step in the magnetoresistive (MR) layer and the recording head subsequently laminated thereon, and the concentration of stress as well. This effect is particularly advantageous when the end magnetic domain control region of the magnetoresistive layer is overlaid on the hard magnetic layer. Also, this construction can effectively avoid the possibility of rupture of the thin magnetoresistive layer at the step of the hard magnetic layer (which step is formed at the boundary between the central sensing region and the end magnetic domain control region), and thus can realize a highly reliable magnetoresistive reproduction head and a magnetic recording and reproducing apparatus employing the same.

[Fourth Embodiment]

Figure 10:
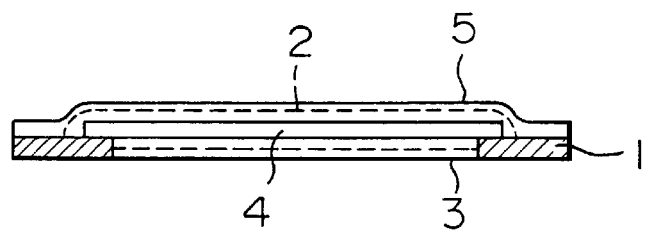
FIGS. 10 to 17 are sections respectively showing further embodiments of the present invention.

A principle of the basic construction of a further embodiment of the MR element in accordance with the present invention is illustrated in FIG. 10.

The illustrated element has the hard magnetic layer 1 formed adjacent the MR layer 3 on a common substrate. The soft magnetic film 5 is formed via the shunt film 4.

Figure 9:
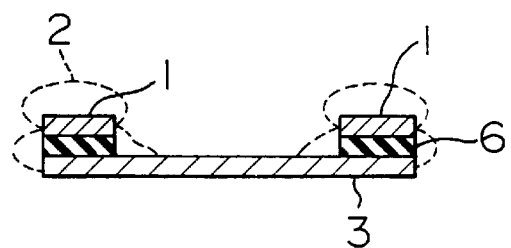
FIG. 9 is a section of a conventional magnetoresistive head, in which a magnetic domain of a magnetoresistive film is controlled by a permanent magnetic film.

The hard magnetic layer 1 is permanently magnetized in a direction parallel to the axis of easy magnetization. The magnetic field 2 leaking from one magnetic pole of the hard magnetic layer enters into the MR film 3. The other magnetic field 2 leaking from the other magnetic pole of the hard magnet layer enters into the soft magnetic film 5. Accordingly, in comparison with the conventional element illustrated in FIG. 9, virtually no magnetic field leaks into the space so that no influence will be exerted on other magnetic materials including the medium.

Figure 11:
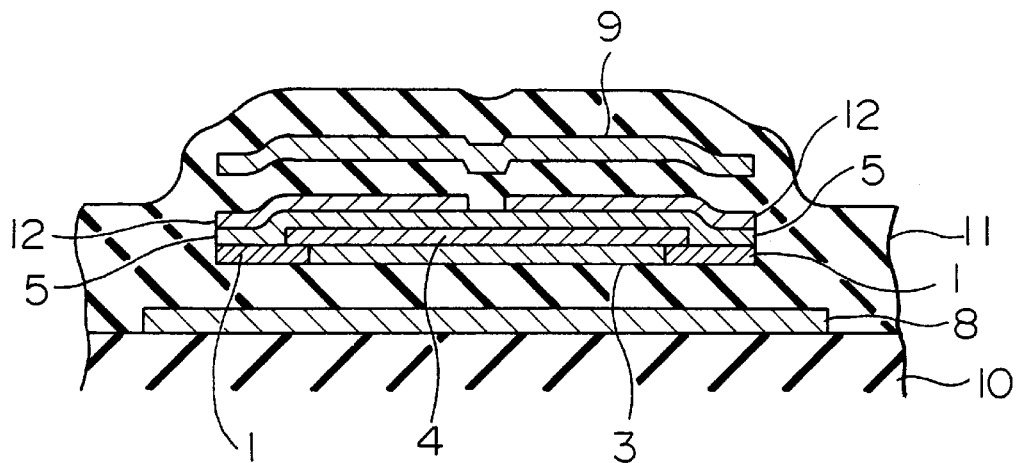

An embodiment of a MR head element employing the MR element shown in FIG. 10 is illustrated in FIG. 11. In FIG. 11, the reference numerals 8 and 9 represent magnetic shield films. The MR element is formed between the magnetic shield films 8 and 9. On a zirconia substrate 10, a Ni-19%Fe film as the magnetic shield layer 8 is formed to have a thickness of approximately 1 μm by way of spattering. Then, maintaining the magnetic shield layer 8 only at the necessary portions by lithography, an alumina layer 11 as an insulation layer is formed thereon. The magnetic shield layer 8 may be an amorphous, Fe-type magnetic layer though the reproduction characteristics may be slightly different.

The thickness of the alumina layer 11 may be variable depending upon the desired recording frequency of the magnetic head. In this embodiment, the alumina layer 11 may have a thickness ranging from 0.1 to 0.5 μm. Then, the Ni-19%Fe layer (magnetostriction coefficient 5×10$^{-7}$) as the MR layer 3 is formed thereon to have a thickness of 3 to 45 nm. Thereafter, the Ni-19%Fe layer is removed, leaving the necessary portion for forming the element. On both sides of the MR layer 3 thus formed, the hard magnetic layer 1 comprising Co-20%Pt alloy layers is formed by vapor deposition. Subsequently, fine processing is performed substantially in the same manner to the MR layer.

Then, a Nb layer as the shunt layer 4 and a Co-Zr-Ta-Ru-type amorphous alloy layer as the soft magnetic layer 5 are formed thereover. The thickness of the Co-Pt hard magnetic layer 1 is in a range of 3 to 100 nm. The electrode 12 necessary for power supply for the element is formed. Thereafter, the alumina layer 11 and the magnetic shield layer 9 are formed. The element thus formed is provided to be 0.5 to 10 μm of the track width. The thicknesses of the alumina layer and the magnetic shield layer 9 are the same as those of the lower side alumina layer and the magnetic shield layer 8. However, the thicknesses of the alumina layer and the magnetic shield layer 9 may be differentiated from those of the lower side depending upon the application of the head.

The head fabricated through the process set forth above is subject to machining so that the height of the MR layer 3 becomes a desired dimension, e.g. 1 to 10 μm. For the head thus fabricated, the reproduction characteristics are evaluated. The recording media used for evaluation are Co-Cr-Ta, Co-Pt-Cr and so forth.

Figure 12:
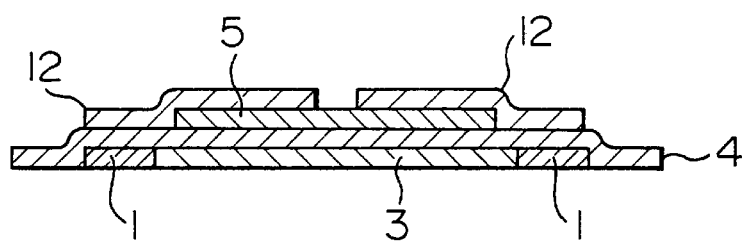

As a result of comparison of the reproduction outputs of the constructions illustrated in FIGS. 11 and 12, the S/N ratio of the head illustrated in FIG. 11 is 3.0, whereas that of the head illustrated in FIG. 12 is 1.5.

[Fifth Embodiment]

Next, a head having a construction in which part of the MR layer overlaps with the hard magnetic layer and a head having a construction in which a part of the MR layer is placed below the hard magnetic layer are experimentally formed. For these heads, the S/N ratio is measured.

Some improvement of the S/N ratio in both magnetic heads could be observed as a consequence of no leakage of the magnetic flux. However, better characteristics are observed in the head having the MR layer, part of which lies on the hard magnetic layer.

Figure 13:
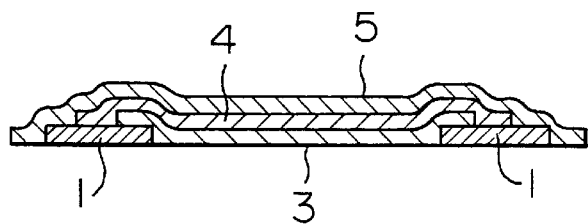

FIG. 13 shows the construction of the head in which the MR layer 3 lies on the hard magnetic layer 1. Although the construction at the junction between the soft magnetic layer 4 and the hard magnetic layer 1 is differentiated from that illustrated in FIG. 11, the illustrated head exhibits a high S/N ratio.

It should be noted that like components are represented by like reference numerals across the various figures, and duplicative discussion has thus been omitted for simplicity of disclosure.

It should be further noted that, in the head having the constructions illustrated in FIGS. 10 and 11, since the magnetic field from the hard magnetic layer 1 enters in the direction of the axis of easy magnetization of the soft magnetic layer 5 for generating the bias field, the magnetic domain or magnetizing condition of not only the MR layer 3 but also the soft magnetic layer 5 for generating the bias field can be controlled. The biasing soft magnetic layer 5 is required to apply a constant magnetic field for the MR layer 3. For this reason, it is required to provide a constant magnetic permeability in the overall soft magnetic layer for generating the bias field. The magnetic permeability becomes constant as long as the soft magnetic layer is maintained in a single domain state. On the other hand, when the soft magnetic layer is in a multi-domain state, or the distribution of the magnetization is substantially unstable, the magnetic permeability cannot be constant. Accordingly, by introducing the magnetic flux into the soft magnetic layer, the reproduction characteristics of the magnetic head can be stabilized.

[Sixth Embodiment]

Figure 14:
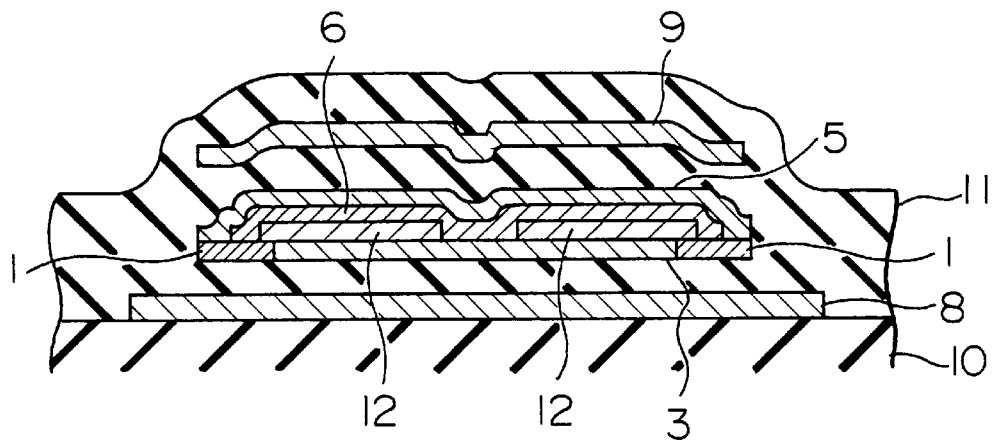

FIG. 14 shows another embodiment exhibiting a similar effect. The element has the hard magnetic layer 1 formed on a common plane with the MR layer 3 and positioned adjacent to the MR layer 3. The soft magnetic layer 5 is formed above the common plane, with an interposed insulation layer 6. The reference numeral 12 denotes an electrode. The hard magnetic layer 1 is magnetized in a direction parallel to the axis of easy magnetization of the MR layer 3. A magnetic field leaking from one of the magnetic poles of the hard magnetic layer 1 thus enters into the MR layer 3. Also, the other magnetic field leaking from the other magnetic pole of the hard magnetic layer 1 enters into the soft magnetic layer 5. Similarly to the example illustrated in FIG. 10, virtually no magnetic field leaks into the space. Therefore, there is substantially no influence on other magnetic materials including the recording medium. It should be noted that the reference numeral 8 denotes the lower magnetic shield layer, reference numeral 9 denotes the upper magnetic shield layer, and reference numeral 10 denotes the substrate.

The head exhibits a high S/N ratio similarly to the embodiment of FIG. 11.

Figure 15:
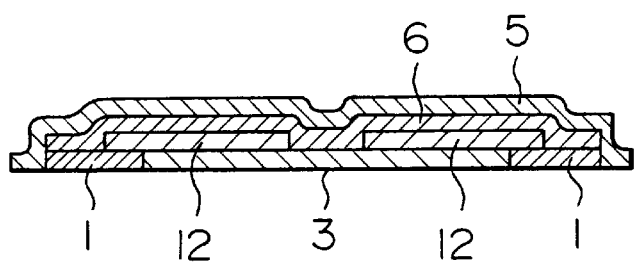
Figure 16:
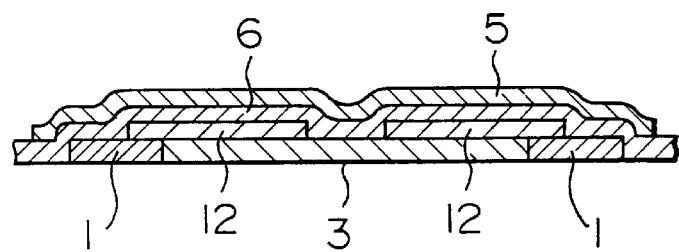

FIGS. 15 and 16 show embodiments in which the configurations of the soft magnetic layer 5 are modified. These heads also exhibit a high S/N ratio as for the embodiment of FIG. 11.

[Seventh Embodiment]

Figure 17:
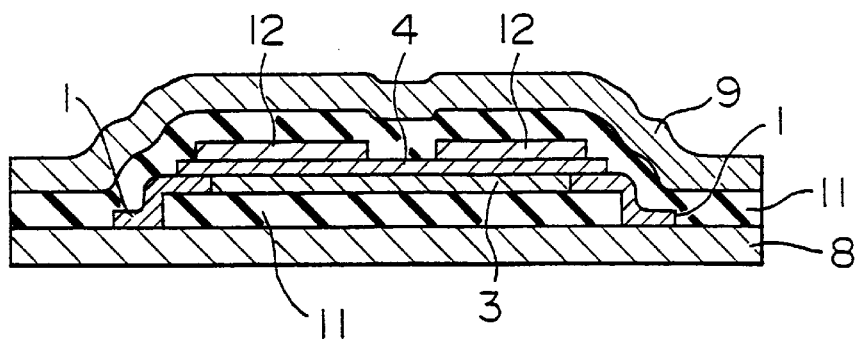

FIG. 17 shows a construction in which the magnetic field leaking from the magnetic pole of the hard magnetic layer 1 provided for controlling the magnetic domain of the MR layer 3 is introduced into the magnetic shield layer 8. Similarly to the foregoing embodiments, virtually no magnetic field leaks into the space so that substantially no influence is given to other magnetic materials including the medium. The head also exhibits a high S/N ratio as for the embodiment of FIG. 11.

In the embodiment shown in FIG. 17, the soft magnetic layer for generating bias is not provided. However, even when the soft magnetic layer is provided, the control effect of the magnetization condition for the magnetoresistive layer is substantially the same. In addition, in the construction of the head, since the magnetic flux is introduced into the magnetic shield layer 8 to control the magnetic domain, the magnetic shielding effect is enhanced so as to obtain a sharp variation of the reproduction waveform with elimination of fluctuation, at the side where the magnetic domain is controlled. Accordingly, in this embodiment of the head, the reproduction wave form becomes sharp and symmetric.

In the foregoing embodiment, components similar to those of the former embodiments are represented by like reference numerals.

Next is a discussion of featured points in the present invention.

When the magnetic domain of the MR layer is controlled by employing the hard magnetic layer, the magnetostrictive constant of the MR layer encounters a problem. Namely, formation of the multi-domain state in the MR layer, which can be a cause of distortion of the output waveform of the MR head, is differentiated depending upon the magnetostrictive constant. When the magnetostrictive constant is substantially large, it becomes impossible to make it into a single magnetic domain state even by employing the hard magnetic layer.

Figure 18:
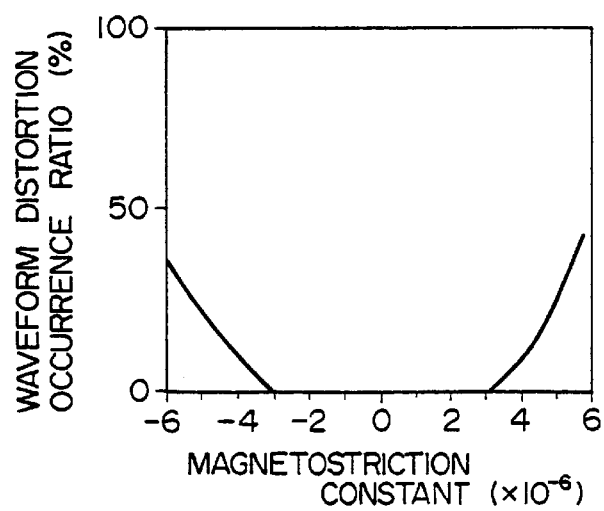
FIG. 18 is a graph showing the relationship between a magnetostrictive constant and a waveform distortion.

With respect to the MR head having the construction in accordance with the present invention, an influence of the magnetostrictive constant of the MR layer was investigated in the range of $+5 \times 10^{-6}$ to $-5 \times 10^{-6}$ of the magnetostrictive constant with the Ni-Fe type magnetoresistive layer having a composition near Ni-19%Fe. As shown in FIG. 18, it becomes clear that while the frequency of occurrence of the distortion of the output waveform of the MR head is held substantially low in a range of the magnetostrictive constant of $+3 \times 10^{-6}$ to $-3 \times 10^{-6}$, if the magnetostrictive constant leaves the above-mentioned range, the frequency of occurrence of distortion of the reproduced waveform is rapidly increased. Accordingly, the magnetostrictive constant of the MR layer to be employed in the MR head having the magnetic domain control construction in accordance with the present invention has to be in a range of $+4 \times 10^{-6}$ to $-4 \times 10^{-6}$, and preferably in a range of $+3 \times 10^{-6}$ to $-3 \times 10^{-6}$.

This is equally true for Co-Ni-type and Ni-Fe-Co-type MR layers.

In the MR head in accordance with the invention, the MR layer is of the Ni-Fe type, for example, and is quite thin. As is well known, the magnetizing condition, such as the magnetic domain structure or the magnetic domain wall structure, is significantly variable depending upon the layer thickness. When the layer thickness exceeds 35 nm, the magnetic domain structure of the MR layer becomes relatively stable, and again becomes unstable when the layer thickness exceeds 70 or 80 nm. Also, in the range of layer thickness less than or equal to 35 nm, the magnetizing condition becomes progressively unstable in accordance with the decrease of the layer thickness. In the magnetic domain control in accordance with the present invention, a remarkable effect can be obtained in the range of layer thickness less than or equal to 35 nm.

Reduction of the layer thickness is advantageous in terms of the head discharge of the MR layer. As a result, according to the decrease of the layer thickness, the allowable current value is increased, which increases the output of the head. Accordingly, it is desirable to have the layer thickness be as thin as possible. However, when the layer thickness becomes less than or equal to 5 nm, the continuity of the layer can be degraded. Also, in the normal film formation process, it is difficult to produce a suitable quality of film. Accordingly, the optimal range of the MR layer in the MR head having the construction in accordance with the present invention is greater than or equal to 5 nm. Particularly, the layer thickness in a range of 5 to 35 nm is remarkably effective.

When the shunt biasing and the soft magnetic layer are employed as the biasing means, a ratio R of the current to be supplied to the MR layer and soft magnetic layer with the shunt layer (assuming that the current in the magnetoresistive layer is 1) is 0.2 to 1.3. When the ratio R is less than or equal to 0.2, even when a metal layer having high electrical resistance is employed as the shunt layer, the distance between the soft magnetic layer and the MR layer becomes too close to establish the construction of the present invention, in which the closed magnetic path is established with the MR layer and the soft magnetic layer. This makes it impossible to simultaneously control the magnetic domains of the MR layer and the soft magnetic layer. In the embodiment where the ratio R is set at 0.2, the suppression effect of the output waveform is insufficient.

On the other hand, when the ratio R is greater than or equal to 1.3, the bias field generated by the shunt biasing and the soft magnetic layer becomes excessive to relatively lower the current of the MR layer to cause lowering of the output. Accordingly, the ratio R in a range of 0.2 to 1.3 is preferred. The specific resistance of the Ni-Fe type MR layer is in a range of 15 to 30 $\mu\Omega$cm. Therefore, the specific resistance of the shunt layer is in a range of 20 to 80 $\mu\Omega$cm and the specific resistance of the soft magnetic layer is in a range of 80 to 150 $\mu\Omega$cm for satisfying the foregoing ratio R.

As the shunt layer satisfying the terms set forth above, Nb, Ti, Ta, V, Mo, W, Hf and alloys thereof, such as Nb-15%Ti alloy and Nb5Ru alloy, can be used. As the material for the soft magnetic layer, an amorphous alloy, such as CoTaZr, CoNbZr and so forth, or a crystallized alloy, such as CoNiFe-type, SENDUST or so forth can be used. In the embodiments employing these materials, the head having $10 \times 10^{-6}$ to $3 \times 10^7$ A/cm$^2$ of current density with less than or equal to 5% of symmetry of the output waveform, may be obtained.

On such a MR head, an Al$_2$O$_3$ layer as the insulation layer is formed by way of spattering. The induction-type recording head is formed thereon to form a composite type magnetic head. With respect to this composite type magnetic head, recording and reproduction characteristics are measured. As a result of measurement, it was found that the head has an output with a high S/N ratio without distortion.

Figure 19:
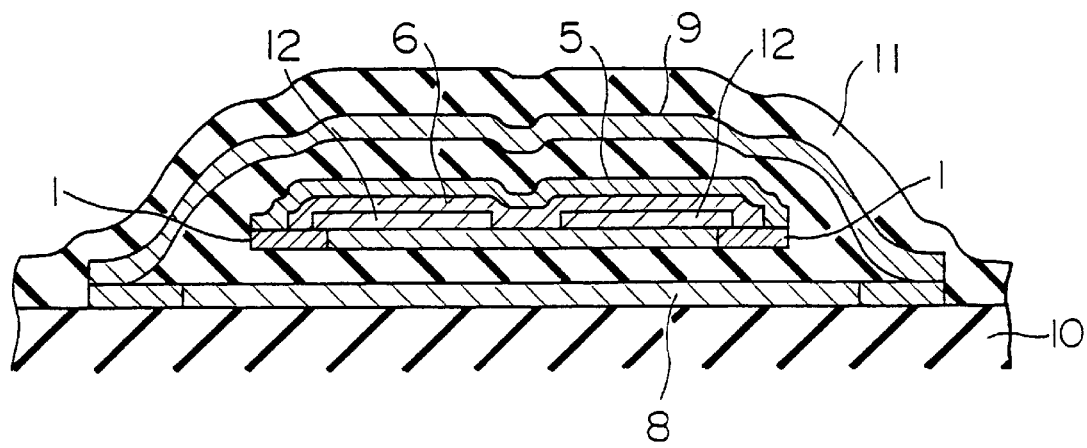
FIG. 19 is a section showing another embodiment of the invention.

The manner of the present invention is applicable not only for domain control for the MR layer but also for the shield layer or a core layer. FIG. 19 shows an embodiment in which the hard magnetic layer 1 is arranged at both ends of the shield layers 8 and 9 for controlling the magnetic domain in the shield layer. Since the magnetic domain in the shield layer can be held stable, noise which causes instant shifting of the magnetic domain wall can be eliminated. Also, superimposing of the off-track noise becomes constant.

The present invention controls the magnetizing state not only for the MR layer of the MR head but also for the soft magnetic layer and the shield layer for generating a biasing field or so forth. Virtually no magnetic field from the hard magnetic layer will be leaked into the space in the direction toward the medium. Also, the leaking magnetic field from the hard magnetic layer will never enter the portion where generation of the magnetic field is unnecessary. Therefore, the magnetic characteristics of the overall head become stable. As a result, distortion of the output waveform can be completely eliminated and other noise can also be remarkably suppressed. Therefore, a magnetic head having optimal characteristics for high density magnetic recording can be provided.

What is claimed is:

1. A magnetoresistance effect reproduction head comprising:
    a magnetoresistive layer;
    a soft magnetic bias layer; and
    a hard magnetic layer adjacent to said magnetoresistive layer, wherein said hard magnetic layer controls the directions of the magnetic domains in said magnetoresistive layer and in said soft magnetic bias layer with a magnetic field leaking from said hard magnetic layer, and with ferromagnetic exchange coupling between said magnetoresistive layer and said hard magnetic layer, so that the magnetic domain directions of said magnetoresistive layer and said soft magnetic bias layer are mutually antiparallel, thereby confining the magnetic field leaking from said hard magnetic layer to a closed magnetic path entirely within the magnetoresistance effect reproduction head, passing from said hard magnetic layer to said magnetoresistive layer, then from said magnetoresistive layer to said soft magnetic bias layer, and then from said soft magnetic bias layer to said hard magnetic layer to complete said closed magnetic path.

2. A magnetoresistance effect reproduction head as set forth in claim 1, wherein said soft magnetic bias layer generates a bias field in a direction of an axis of difficult magnetization of said magnetoresistive layer, said soft magnetic bias layer being provided adjacent said magnetoresistive layer, and wherein the magnetic field leaking from said hard magnetic layer is simultaneously generated in a direction of axes of easy magnetization of said magnetoresistive layer and said soft magnetic bias layer for forming the closed magnetic path and for controlling the magnetic domains of said magnetoresistive layer and said soft magnetic bias layer.

3. A magnetoresistance effect reproduction head as set forth in claim 2, wherein said magnetoresistive layer and said soft magnetic bias layer are respectively in magnetic contact with parts of said hard magnetic layer so that the magnetic domains of said magnetoresistive layer and said soft magnetic bias layer are controlled by the magnetic field leaking from said hard magnetic layer and ferromagnetic exchange coupling of said magnetoresistive layer and said soft magnetic bias layer with said hard magnetic layer.

4. A magnetoresistance effect reproduction head as set forth in claim 1, wherein said soft magnetic bias layer is placed adjacent to said magnetoresistive layer with a non-magnetic insulation layer therebetween, the soft magnetic bias layer serving as a bias field generating means for generating a bias field in a direction of an axis of difficult magnetization of said magnetoresistive layer, and wherein the magnetic field leaking from said hard magnetic layer is simultaneously generated in a direction of axes of easy magnetization of said magnetoresistive layer and said soft magnetic bias layer for forming the closed magnetic path and for controlling the magnetic domains of said magnetoresistive layer and said soft magnetic bias layer.

5. A magnetoresistance effect reproduction head as set forth in claim 4, wherein said magnetoresistive layer and said soft magnetic bias layer are respectively in contact with parts of said hard magnetic layer so that the magnetic domains of said magnetoresistive layer and said soft magnetic bias layer are controlled by the magnetic field leaking from said hard magnetic layer and ferromagnetic exchange coupling of said magnetoresistive layer and said soft magnetic bias layer with said hard magnetic layer.

6. The magnetoresistance effect reproduction head as set forth in claim 1, wherein said hard magnetic layer is adjacent to said soft magnetic bias layer.

7. A magnetoresistance effect reproduction head comprising:

a magnetoresistive layer;

a soft magnetic bias layer;

a pair of electrode layers for supplying detecting current for said magnetoresistive layer; and a hard magnetic layer for controlling the directions of the magnetic domains in said magnetoresistive layer and in said soft magnetic bias layer, so that the magnetic domain directions of said magnetoresistive layer and said soft magnetic bias layer are mutually antiparallel, thereby confining magnetic flux from said hard magnetic layer to a closed magnetic path, magnetoresistance effect reproduction head, passing from said hard magnetic layer to said magnetoresistive layer, then from said magnetoresistive layer to said soft magnetic bias layer, and then from said soft magnetic bias layer to said hard magnetic layer to complete said closed magnetic path, entirely within said magnetoresistance effect reproduction head.

8. A magnetoresistance effect reproduction head as set forth in claim 7, wherein said soft magnetic bias layer is arranged substantially parallel to said magnetoresistive layer.

9. A magnetoresistance effect reproduction head as set forth in claim 7, wherein said soft magnetic bias layer acts as a magnetic shield layer arranged substantially parallel to said magnetoresistive layer.

10. A magnetoresistance effect reproduction head as set forth in claim 7, wherein the hard magnetic layer comprises first and second coplanar portions, and wherein the distance between the first and second coplanar portions is greater than the distance between said pair of electrode layers.

* * * * *